(12) United States Patent
Zhang et al.

(10) Patent No.: US 6,231,816 B1
(45) Date of Patent: *May 15, 2001

(54) LOW TEMPERATURE SENSITIVITY OXYGEN GENERATING COMPOSITIONS

(75) Inventors: Yunchang Zhang; James C. Cannon, both of Overland Park, KS (US)

(73) Assignee: BE Intellectual Property, Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,292

(22) Filed: Mar. 14, 2000

Related U.S. Application Data

(63) Continuation of application No. 09/016,610, filed on Jan. 30, 1998, now Pat. No. 6,054,067.

(51) Int. Cl.$^7$ .............. A62B 7/08; A62B 21/00; C01B 11/14; C01B 11/18
(52) U.S. Cl. ............... 422/126; 252/187.31; 252/187.1; 149/77; 149/113
(58) Field of Search ............... 252/187.31, 187.1; 422/126; 149/77, 113

(56) References Cited

U.S. PATENT DOCUMENTS

| | | | |
|---|---|---|---|
| 4,073,741 | 2/1978 | Heintz | 423/240 |
| 5,198,147 | 3/1993 | Zhang et al. | 252/187.31 |
| 5,279,761 | 1/1994 | Zhang et al. | 252/187.31 |
| 5,298,187 | 3/1994 | Zhang et al. | 252/187.31 |
| 5,338,516 * | 8/1994 | Zhang et al. | 422/126 |
| 5,783,105 * | 7/1998 | Zhang et al. | 252/187.31 |
| 5,882,545 * | 3/1999 | Zhang et al. | 252/187.31 |
| 6,007,736 * | 12/1999 | Zhang et al. | 252/187.31 |
| 6,030,583 * | 2/2000 | Kshirsagar et al. | 422/126 |
| 6,054,067 * | 4/2000 | Zhang et al. | 252/187.31 |

FOREIGN PATENT DOCUMENTS

| | | |
|---|---|---|
| WO 93/17961 | 9/1993 | (WO) . |
| WO 97/17282 | 5/1997 | (WO) . |
| WO 97/43209 | 11/1997 | (WO) . |
| WO 97/43210 | 11/1997 | (WO) . |

* cited by examiner

Primary Examiner—Joseph D. Anthony
(74) Attorney, Agent, or Firm—Fulwider Patton Lee & Utecht, LLP

(57) ABSTRACT

The oxygen generation compositions include about 0.5–15% by weight of a substantially carbon-free metal fuel, and about 0.1–20% by weight of alkali metal silicate, stannate, titanate or zirconate as a reaction rate and core rheology modifier and chlorine suppresser. The oxygen generating compositions also contain about 0.1–15% by weight of a transition metal oxide catalyst; and the remainder is substantially an alkali metal chlorate or perchlorate.

6 Claims, 1 Drawing Sheet

LOW TEMPERATURE SENSITIVITY OXYGEN GENERATING COMPOSITIONS

RELATED APPLICATIONS

This is a continuation of Ser. No. 09/016,610 filed Jan. 30, 1998 now U.S. Pat. No. 6,054,067.

BACKGROUND OF THE INVENTION

1. Field of the Invention

This invention relates generally to oxygen generating compositions, and more particularly concerns improved low temperature sensitivity oxygen generating compositions including alkali metal silicate, stannate, titanate or zirconate as a reaction rate and rheology modifier and chlorine suppresser.

2. Description of Related Art

Chemical oxygen generators are typically used in situations requiring the generation of supplemental oxygen, such as in aviation and in submarines, for example, and in other similar settings where it is useful to furnish a convenient and reliable supply of oxygen gas of breathable quality. Chemical oxygen generating compositions based upon the decomposition of alkali metal chlorates or perchlorates have long been used as an emergency source of breathable oxygen in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference.

An aircraft oxygen generator is commonly preprogrammed according to the descent profile of a given type of airplane, and must meet the minimum oxygen flow requirement at all times during a descent. When the oxygen generating reaction is initiated at one end of the core, the reaction front propagates along the longitudinal axis toward the other end of the core as oxygen is generated. Ideally, the reaction zone moves at a steady, repeatable rate governed by the amounts of fuel and catalyst incorporated at a given point along the length of the core. However, oxygen gas formed inside a chemical oxygen generation core or candle must develop sufficient pressure to escape from the core. This effect can cause an uneven and erratic flow of oxygen from an activated oxygen generation core.

In order to meet minimum flow requirements despite such variations in oxygen flow from the core, excess weight of the chemical oxygen generating composition is commonly used. Heavier cores also typically need to be used to insure the cores have sufficient duration, because relatively large cavities can develop during operation of such oxygen generating candles, resulting in irregular oxygen flow when oxygen generating candles made with such compositions are operated at high temperatures. Melting of the oxygen generating core under such conditions can also make the core vulnerable to high intensity vibrations. To minimize unnecessary weight, particularly in aircraft, it would be desirable to provide oxygen generating compositions that can facilitate the flow of oxygen from an activated oxygen generation core. It would also be desirable to provide oxygen generating compositions that are substantially free from carbon and organic contamination that can result in unacceptable levels of carbon monoxide or carbon dioxide contamination in the oxygen produced, that have lower sensitivity to environmental temperatures, and that are structurally more robust to withstand high levels of vibration during operation.

When expended chemical core residues are visually examined, several conditions can be observed which indicate behavior that occurred during the oxygen generating reaction. When the oxygen evolved at a steady and smooth rate, the pores left in the residue are typically small and uniform. The presence of large cavities typically indicate the formation of very large bubbles associated with very large bursts of oxygen release. Such large bubbles tend to perturb heat transfer into other regions of the core, and can result in a large burst of oxygen release follow by a temporary sharp decline or dip in oxygen evolution.

Gross physical distortion in the shape of the residue, relative to the shape of the unreacted core, can be evidence of a very runny reaction zone that can result in possible mechanical failure of the core in the event of exposure of the core to severe vibration during operation of the oxygen generator. On the other hand, relatively uniform, laminar patterns of pores in the residue is suggestive of a well ordered reaction zone. The presence of irregular swirls in the residue can indicate that the reaction zone was severely disturbed and may have mechanically collapsed, which can also be correlated with an irregular flow of oxygen.

The various reaction behaviors that are observable in the residues of oxygen generation cores are related to the melt properties of the chemical core. The reaction temperature is approximately 500° C. or higher inside the operating chemical core. Because sodium chlorate melts at about 265° C., during operation of the oxygen generator, sodium chlorate can melt in an unconstrained manner and form puddles that can cause the core to collapse. Unconstrained melting, puddling, and collapsing of the core can result in a disorganized, irregular reaction front and an irregular oxygen generation rate, causing variation in performance from core to core, and can make the oxygen generation rate and the rate at which the reaction zone moves more temperature dependent, particularly in that the oxygen generation rate becomes much lower at lower temperatures due to bursts and dips. Solid phase decomposition of the oxygen generating reaction mixture can also cause the undecomposed portion of the core to crack, resulting in an erratic oxygen generation rate. This phenomenon is particularly likely at lower environmental temperatures. Since a minimum oxygen flow and a minimum duration are required at all operating temperatures, a heavier conventional oxygen generating core is commonly needed to insure the oxygen flow curve does not dip below the customer specification for operation under cold conditions and that the duration is longer than the specification for hot conditions.

In addition, when chemical cores melt in an unconstrained way, the melted material can come in contact with the oxygen generator housing, resulting in hot spots on the generator wall, which can result in temperatures that exceed applicable performance specifications. The duration of oxygen generation can also be much shorter at higher temperatures due to a poorly organized reaction zone, which can have a larger reacting volume than expected. Oxygen generating compositions are also commonly required to function within a wide range of environmental temperatures, as low as −30° and as high as 60° C., for example. Since the rate of decomposition of sodium chlorate is temperature dependent, an excess weight of the chemical oxygen generating composition is commonly used in order to insure that both required minimum flow rates in colder temperatures and minimum duration specifications at high temperatures are met. It would be desirable to provide oxygen generating compositions that do not require increasing the core weight, and can provide a more uniform rate of oxygen generation over an operating range of temperatures.

There is a need to provide oxygen generating cores that do not melt in an unconstrained manner to form puddles, and that retain their structural integrity and shape during operation of the oxygen generator, allowing reduction or elimination of preformed insulation layers used to increase the mechanical integrity of the operating core. There is also a need to reduce the probability of a localized high temperature spot on the generator wall, to lower the maximum wall temperature during operation. It would further be desirable to provide oxygen generating compositions that produce smoother oxygen flow curves and have lower temperature sensitivity. The present invention meets these needs.

SUMMARY OF THE INVENTION

Briefly, and in general terms, the present invention provides for improved chlorate/perchlorate oxygen generation compositions including an alkali metal silicate, stannate, titanate or zirconate as a reaction rate and core rheology modifier and chlorine suppresser. The compositions produce a smoother, more uniform rate of oxygen generation, and lower temperature sensitivity. Chemical cores made from these compositions do not change their shape during operation and are more resistant to vibration.

The invention accordingly provides for an oxygen generating composition for producing a breathable oxygen gas upon ignition of the composition, comprising about 0.5–15% by weight of a substantially carbon-free metal powder as a fuel; from about 0.1% to about 15% by weight of a transition metal oxide catalyst; about 0.1–20% by weight of an alkali metal silicate, alkali metal stannate, alkali metal titanate or alkali metal zirconate or combinations thereof as a reaction rate and core rheology modifier and chlorine suppresser. The remainder substantially comprises an oxygen source selected from the group consisting of alkali metal chlorates, alkali metal perchlorates, and mixtures thereof. Optionally, a pressing aid such as glass powder or fiber glass can also be used to facilitate the formation of oxygen generating cores by compacting or molding under pressure.

In a currently preferred embodiment, the metal fuel is a metal powder selected from the group consisting of tin, titanium, copper, aluminum, magnesium and mixtures thereof, although other similar metal powders may also be suitable that are substantially carbon-free, energetic, and that safely release heat without introducing contaminants.

The transition metal oxide catalyst is preferably selected from the group consisting of cobalt oxide, copper oxide, nickel oxide, iron oxide, manganese oxide, and mixtures thereof. Cobalt oxide, nickel oxide and copper oxide are currently preferred.

In one preferred embodiment, the oxygen generating composition comprises an alkali metal chlorate or perchlorate, or mixture thereof, as an oxygen source; 0.1 to 15% by weight of a transition metal oxide as a catalyst; a metal powder as a fuel, selected from the group consisting of tin, titanium, and mixtures thereof; and from 0.1 to 20% by weight of an additive selected from alkali metal silicate, alkali metal stannate, alkali metal titanate, alkali metal zirconate, and mixtures thereof as a reaction rate modifier, core rheology modifier and chlorine suppresser.

The oxygen source is preferably selected from sodium chlorate, potassium perchlorate, lithium perchlorate, and mixtures thereof. Sodium chlorate is currently preferred. One presently preferred embodiment utilizes a sodium silicate such as sodium metasilicate or sodium orthosilicate, and preferably comprises about 1–10% by weight of the composition.

These and other aspects and advantages of the invention will become apparent from the following detailed description and the accompanying drawing, which illustrates by way of example the features of the invention.

DETAILED DESCRIPTION OF THE PREFERRED EMBODIMENTS

Figure 1:
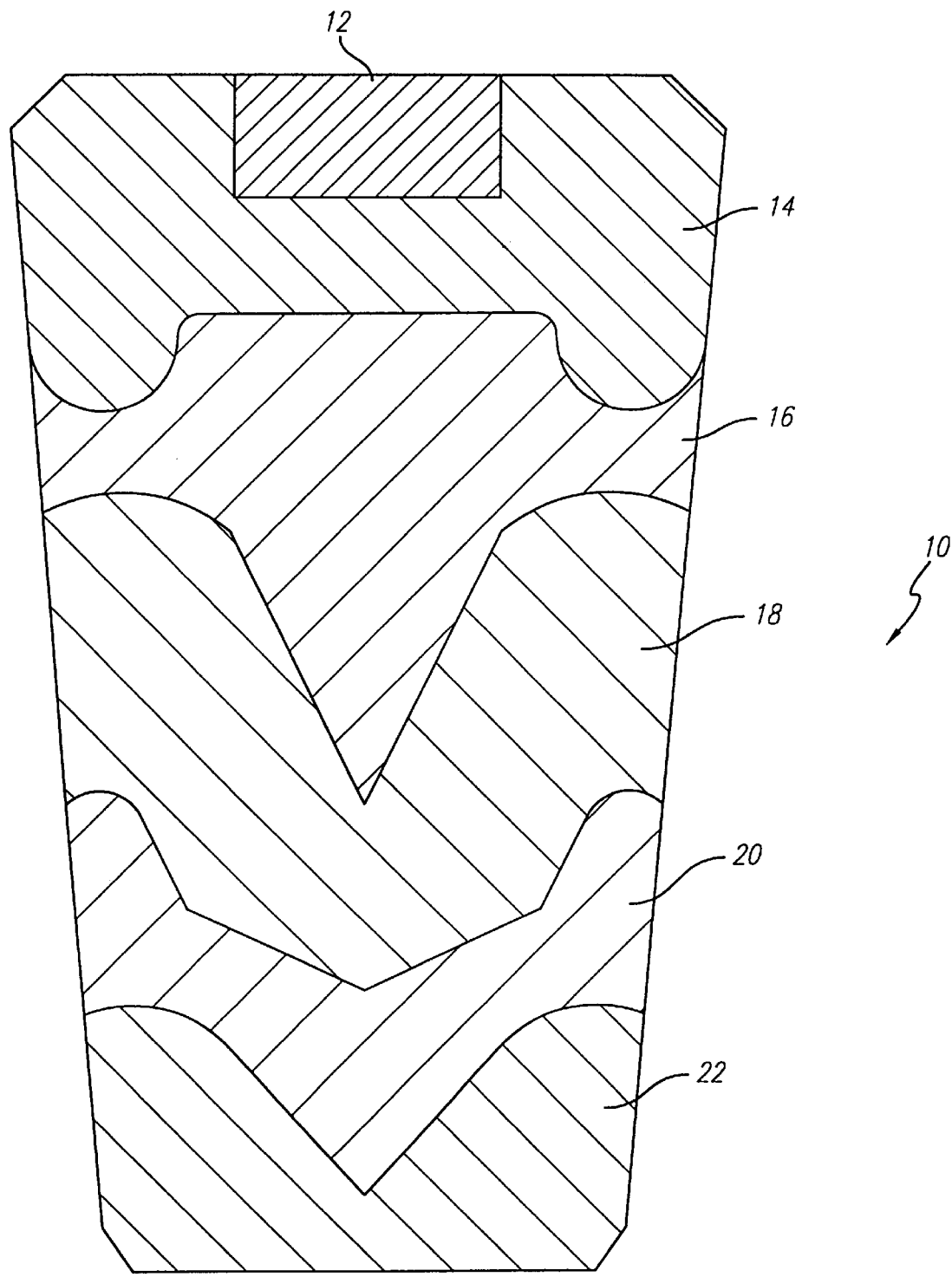
FIG. 1 is a cross sectional view of an oxygen generating candle formed from the oxygen generating composition according to the principles of the invention.

Chemical oxygen generating cores for use in aircraft systems are subject to significant stresses and difficult operating environments. Under these conditions, a chemical oxygen generating core may partially melt during operation. The melting can cause the formation of puddles and can cause the core to collapse, resulting in an uneven and erratic oxygen generating rate that is highly undesirable. Chemical oxygen generators are also subject to constant vibration. If the chemical core melts and collapses, the vibration can make the performance of the generator more erratic and can sometimes result in failure. In addition, molten salt may come in contact with the generator housing and result in localized hot spots and cause the wall temperature of the generators to exceed the maximum temperature allowed. Therefore, it is necessary to prevent the chemical-oxygen generating cores from melting and collapsing.

The present invention is embodied in improved oxygen generating compositions that contain a structural rheology modifier that can make the oxygen generating blocks resistant to vibration, and can prevent the chemical cores from melting and collapsing. The compositions produce a smoother and more uniform oxygen generation rate, and have lower temperature sensitivity than previous formulations. The oxygen generating compositions of the invention contain an additive which functions as a reaction rate and core rheology modifier and chlorine suppresser. The oxygen generating compositions preferably contain about 0.1–20% by weight of the additive, which can be selected from the alkali metal silicates, alkali metal stannates, alkali metal titanates and the alkali metal zirconates. In a presently preferred embodiment, the additive is about 1–10% by weight of sodium metasilicate or sodium orthosilicate, or mixtures thereof.

The oxygen generating compositions contain about 0.5–15% by weight of a substantially carbon-free metal powder as a fuel. In one currently preferred embodiment, a substantially carbon-free powder is used as a fuel to supply the heat for sustaining the decomposition of the oxygen source, and the metal fuel can be tin, titanium, or mixtures of tin and titanium. Other similar metal fuels that are substantially carbon-free, and that are energetic and safely release heat without introducing contaminants, such as copper, aluminum and magnesium, for example, may also be suitable, as long they have a high purity and small particle size.

The oxygen generating composition also preferably contains from about 0.1% to about 15% by weight of a transition metal oxide catalyst. The transition metal oxide catalyst utilized can be selected from the group consisting of cobalt oxide ($Co_3O_4$), copper oxide, nickel oxide, iron oxide, manganese oxide, and mixtures thereof. In one currently preferred embodiment, the transition metal oxide catalyst is selected from cobalt oxide, nickel oxide, copper oxide, and mixtures thereof; however, cobalt oxide is currently preferred.

Sodium silicate is a preferred additive because it functions as a reaction rate modifier and a binder, so that it can be used to replace calcium hydroxide and glass powder in chemical oxygen generating compositions, allowing a reduction of the number of ingredients to be mixed in the oxygen generating compositions, simplifying the weighing and mixing processes. In addition, sodium silicate functions as a very good rheology modifier. Oxygen generating compositions containing sodium silicate as an additive have lower sensitivity to environmental temperatures, smoother oxygen generating, and are structurally more robust to withstand high levels of vibration during operation.

The most common sodium silicates are sodium metasilicate, $Na_2SiO_3$, and sodium orthosilicate, $Na_4SiO_4$. Granular anhydrous sodium metasilicate available from Alfa Chemical, Aldrich Chemical, and Van Waters & Rogers are suitable. In one currently preferred embodiment, granular anhydrous sodium metasilicate is ground to pass 60 mesh sieve to facilitate mixing, and although more finely ground powder will be more effective, and coarser powder will be less effective, granular anhydrous sodium metasilicate that is finer or coarser can be expected to work, and may also be suitable. Hydrated sodium silicate is more expensive, but may also be suitable. The $Na_2O/SiO_2$ ratios for sodium metasilicate and sodium orthosilicate are 1:1 and 2:1, respectively, and sodium silicates with a $Na_2O/SiO_2$ ratio between 1:1 and 2:1 should also be suitable. Other alkali metal silicates, such as lithium metasilicate and potassium metasilicate function similarly to the sodium silicates, even though they are less desirable because they are more expensive. All alkali metal silicates with a ratio of 1:1 to 2:1 $M_2O/SiO_2$, (where M is an alkali metal atom) should function similarly and also be suitable. In addition, titanate, zirconate and stannate of lithium, sodium and potassium should also function in a manner similar to sodium silicate.

Sodium metasilicate of sufficient chemical purity is free from organic contamination that can result in unacceptable levels of carbon monoxide or carbon dioxide contamination in the oxygen produced, and is relatively inexpensive. When sodium metasilicate is used, the oxygen generating cores do not melt in an unconstrained manner to form puddles, and they do not collapse even during operation at high environment temperatures. The cores retain their structural integrity and shape during operation of the oxygen generator, and the potential for vibration failure can be avoided. In addition, the need for preformed insulation layers used to increase the mechanical integrity of the operating core can be reduced or eliminated.

Sodium metasilicate is also capable of modifying the activity of a catalyst such as cobalt oxide in a manner which avoids reaction in the solid phase, while allowing the catalyst to facilitate the decomposition of the sodium chlorate in the liquid phase. When operating at hot environments, on the other hand, sodium metasilicate can form a gel network which constrains the melting down of the core, to prevent the core from forming puddles or even collapsing. Sodium metasilicate based oxygen generating compositions produce smoother oxygen flow curves and have lower temperature sensitivity. This reduction in variability of product performance can lead to a higher core manufacturing yield, or can result in lighter core weight with an unchanged manufacturing yield. The cores containing sodium silicate are mechanically more robust and less vulnerable to vibration. The probability of a localized high temperature spot on the generator wall can also be reduced, lowering the maximum wall temperature observed during operation.

The remainder of the oxygen generating compositions, typically about 50% to about 99.3% by weight of the total oxygen generating composition, substantially comprises an oxygen source selected from the group consisting of alkali metal chlorates, alkali metal perchlorates, and mixtures thereof, although a few percent of a pressing aid such as glass powder or fiber glass can also be used to facilitate the formation of oxygen generating cores by compacting or molding under pressure. The oxygen source is preferably selected from sodium chlorate, potassium perchlorate, lithium perchlorate, and mixtures thereof. Sodium chlorate is currently preferred. In the presently preferred embodiment in which the oxygen generating composition contains about 1–10% by weight sodium metasilicate or sodium orthosilicate, or mixtures thereof as the additive, the oxygen source comprises about 60% to about 98.4% by weight of the total oxygen generating composition.

In forming an oxygen generating core or candle, the metal powder fuel, metal oxide catalyst, sodium silicate modifier and optionally glass powder (if used) are premixed. The oxygen source chlorate/perchlorate component is typically separately mixed with approximately 1 to 5% water, by weight. The premixed powder is then mixed with the wet chlorate/perchlorate. The chemical oxygen candles are formed by compaction of the damp mixture in a mold, and are then dried to remove the water that was added during the mixing process.

With reference to FIG. 1, a chemical oxygen generating candle 10 typically has a cylindrical shape, and commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles.

The top of the candle there is a recess to hold an ignition pellet 12, which can be ignited by firing a percussion primer, for example. The heat from the ignition pellet initiates the decomposition of the layers 14, 16, 18, 20 and 22 of the oxygen generating candle to release oxygen.

The oxygen generating compositions of the invention are further illustrated in the following examples, in which percentages are by weight. In these examples, the first one or two layers of the core do not contain sodium metasilicate, in order to insure a fast start without using too much fuel and catalyst. However, sodium silicate can be used in some or all of the layers of the cores, depending upon the needs of the various applications.

EXAMPLE 1

Layer 1: 24 grams: 11.0% tin powder, 9.0% cobalt oxide, 4.0% glass powder, and 76.0% $NaClO_3$.

Layer 2: 63.7 grams: 6.3% tin powder, 0.7% MgO, 2.0% glass powder, 1.2% $Co_3O_4$, and 89.8% $NaClO_3$.

Layer 3: 127 grams: 5.5% tin powder, 5.0% $Na_2SiO_3$, 1.1% $Co_3O_4$, and 88.4% $NaClO_3$.

Layer 4: 382 grams: 3.5% tin powder, 5.0% $Na_2SiO_3$, 0.6% $Co_3O_4$, and 90.9,% $NaClO_3$.

Layer 5: 206 grams: 2.5% tin powder, 5.0% $Na_2SiO_3$, 0.4% $Co_3O_4$, and 92.1% $NaClO_3$.

The powders other than sodium chlorate for each layer were premixed. The mixed powder was then mixed with sodium chlorate. A small amount of distilled water was used to wet each mixture. Chemical oxygen candles were then formed through compacting of the damp mixtures in a mold. The candles formed were then dried at 120° C. to remove the water added.

A dried candle was loaded into a stainless steel housing and ignited. The candle operated for 23.1 minutes and generated 231 liters of oxygen at room temperature. The reaction was uniform, and the expended candle retained the shape of the unused candle and had very uniform texture with small pores, indicative of a smooth reaction.

EXAMPLE 2

Layer 1: 24 grams: 11.0% tin powder, 9.0% cobalt oxide, 4.0% glass powder, and 76.0% $NaClO_3$.

Layer 2: 63.7 grams: 6.3% tin powder, 0.7% MgO, 2.0% glass powder, 1.2% $Co_3O_4$, and 89.8% $NaClO_3$.

Layer 3: 127 grams: 5.5% tin powder, 5.0% $Na_2SiO_3$, 1.1% $Co_3O_4$, and 88.4% $NaClO_3$.

Layer 4: 500 grams: 3.5% tin powder, 5.0% $Na_2SiO_3$, 0.6% $Co_3O_4$, and 90.9% $NaClO_3$.

An oxygen generating core was formed using these mixtures according to the procedures in Example 1. When loaded into a stainless steel housing and ignited, the candle operated smoothly for 17.3 minutes and generated 230 liters of oxygen at room temperature. The shape of the oxygen generating core was retained, and the expended core had a very uniform texture with small pores.

EXAMPLE 3

Layer 1: 16.3 grams: 11.0% tin powder, 9.5% cobalt oxide, 3.0% glass powder, and 76.5% $NaClO_3$.

Layer 2: 47 grams: 8.0% tin powder, 0.7% MgO, 1.6% cobalt oxide, 2% glass powder, and 87.7% $NaClO_3$.

Layer 3: 78.5 grams: 7.0% tin powder, 4.0% $Na_2SiO_3$, 1.6% cobalt oxide, and 87.4% $NaClO_3$.

Layer 4: 98 grams: 4.0% tin powder, 4.0% $Na_2SiO_3$, 0.74% cobalt oxide, and 91.26% $NaClO_3$.

Layer 5: 53.9 grams: 3.0% tin powder, 2.5% $Na_2SiO_3$, 0.51% cobalt oxide, and 93.3% $NaClO_3$.

An oxygen generating core was formed using these mixtures according to the procedure in Example 1. When loaded into a stainless steel housing and ignited, the candle operated for 13.0 minutes and generated 85.2 liters of oxygen.

Expended oxygen generating cores which have been formed and operated in accordance with the invention at hot, cold and room temperature environmental conditions all typically have very uniform texture with small, uniform pores, and without large pores or cavities. The original shape of the cores is retained during the operation of the oxygen generator cores, and the physical appearance of the expended cores which are operated at hot, cold and room temperature environmental conditions are almost indistinguishable. Because no melting down, or formation of puddles or large cavities occur, the oxygen flow curves for the oxygen generating compositions according to the invention are very smooth.

It has thus been demonstrated that the improved oxygen generation compositions of the invention produce a significantly lower level of carbon monoxide contamination of oxygen generated, have a smoother, more uniform rate of oxygen generation, have a lower sensitivity to changes in temperature, and have a lower operating temperature than a comparable oxygen generation composition utilizing iron powder as a fuel. It will be apparent to those skilled in the art from the foregoing that while particular forms of the invention have been illustrated and described, various modifications can be made without departing from the spirit and scope of the invention. Accordingly, it is not intended that the invention be limited, except as by the appended claims.

What is claimed is:

1. In an oxygen generating composition for producing a breathable oxygen gas upon ignition of the composition, the oxygen generating composition comprising about 0.5–15% by weight of a metal fuel; about 0.1% to about 15% by weight of at least one transition metal oxide catalyst; about 0.1 to about 20% by weight of an additive selected from the group consisting of an alkali metal silicate, an alkali metal stannate, an alkali metal titanate, an alkali metal zirconate, and mixtures thereof; and the remainder substantially comprising an oxygen source selected from the group consisting of alkali metal chlorates, alkali metal perchlorates, and mixtures thereof, the improvement wherein said metal fuel is substantially carbon-free copper.

2. The oxygen generating composition of claim 1, wherein said transition metal oxide catalyst is selected from the group consisting of cobalt oxide, copper oxide, nickel oxide, iron oxide, manganese oxide, and mixtures thereof.

3. The oxygen generating composition of claim 1, wherein said transition metal oxide catalyst is selected from the group consisting of cobalt oxide, copper oxide and nickel oxide.

4. The oxygen generating composition of claim 1, wherein said additive is selected from the group consisting of sodium metasilicate and sodium orthosilicate.

5. The oxygen generating composition of claim 1, further comprising a binder selected from the group consisting of glass powder, fiber glass and mixtures thereof.

6. The oxygen generating composition of claim 1, wherein said transition metal oxide catalyst is $Co_3O_4$.

* * * * *

UNITED STATES PATENT AND TRADEMARK OFFICE
CERTIFICATE OF CORRECTION

PATENT NO. : 6,231,816 B1
DATED : May 15, 2001
INVENTOR(S) : Yungchang Zhang, James C. Cannon It is certified that error appears in the above-identified patent and that said Letters Patent is hereby corrected as shown below:

<u>Title page,</u>
Add new heading -- OTHER PUBLICATIONS --.
After new heading, add the following, -- International Search Report dated May 10, 1999 --.

Signed and Sealed this

Thirteenth Day of November, 2001

*Attest:*

NICHOLAS P. GODICI
*Attesting Officer*     *Acting Director of the United States Patent and Trademark Office*